G. L. COLLINS & G. GASCOIGNE.
DUMPING WAGON.
No. 188,103. Patented March 6, 1877.
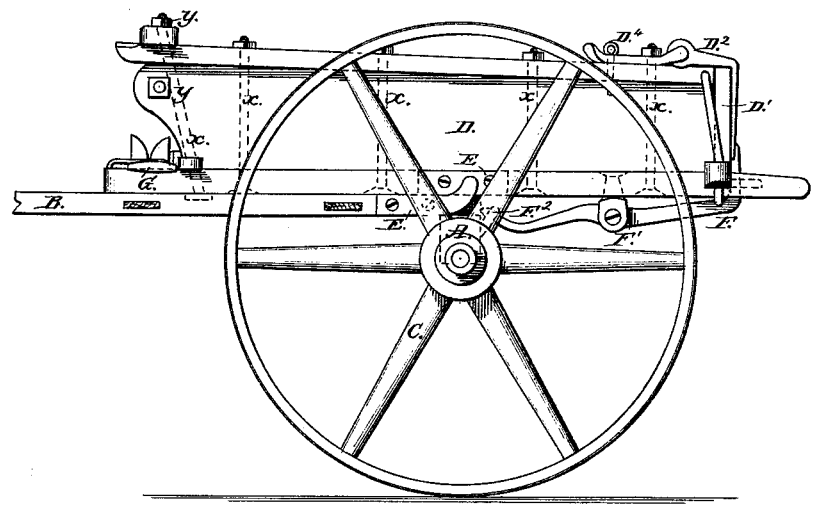
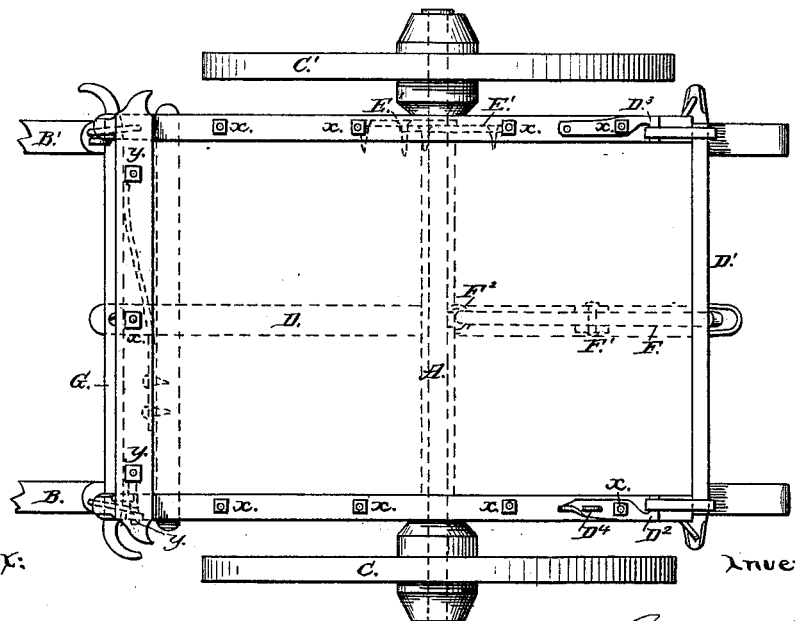

UNITED STATES PATENT OFFICE

GEORGE L. COLLINS AND GEORGE GASCOIGNE, OF CHAMBERSBURG, N. J.

IMPROVEMENT IN DUMPING-WAGONS.

Specification forming part of Letters Patent No. 188,103, dated March 6, 1877; application filed November 27, 1875.

*To all whom it may concern:*

Be it known that we, GEORGE L. COLLINS and GEORGE GASCOIGNE, of Chambersburg, in the county of Mercer and State of New Jersey, have invented an Improvement in Carts, of which the following is a specification:

Our invention consists of a dumping-axis formed by brackets secured to either side of the body and shafts, the construction being such that the motions of the body in dumping automatically operate the latch for locking and releasing the tail-board; also, in a novel construction of hinges for securing and operating tail-board. The object of this part of our invention is, by the proper use of simple and less expensive mechanism, to remove the obstruction to the free loading of carts, caused by the mistaken use of raised standards and cross-rods for pivoting the tail-board; and consists in bending one leaf in each of the hinges which secure the tail-board to the body of the cart, at a suitable point between its axis of suspension and the end of the leaf, into or near the form of a right angle, whereby the tail-board is compelled to swing above its axis of suspension, and give free exit to the load in dumping.

Figure 1 is a side elevation of a cart embodying our improvements. Fig. 2 is a plan of the same.

A, Fig. 1, is the axle to which the shafts B B' are rigidly secured by through-bolts, or in any other suitable manner, and properly fitted with the wheels C C'. D is the body of an improved cart. $D^1$ is the tail-board, secured to the sides of body D by our improved hinges $D^2$ $D^3$, one leaf in each hinge, at a suitable point between its axis and the end of the leaf is bent into or near the form of a right angle, for the purpose hereinbefore specified. $D^2$ is a draw-pin, for detaching tail-board $D^1$ from the cart. E E' are brackets, forming the dumping-axis by the projecting stud of the male fitting a corresponding recess, of circular form, in the female of each pair, and are secured to either side of the body D and shafts B B', respectively, by screws or through-bolts. F is the latch for securing and releasing tail-board $D^1$. $F^1$ is a pivot, secured to cart-body D, on which the latch F is suspended. $F^2$ is a socket secured to axle A, for operating latch F. G is a lever, operated by spring for securing cart-body D, and is already patented to Mr. George L. Collins. $x$, through-bolts, and $y\ y$ quadrant braces, securing parts.

The operation of our improved cart is substantially as follows: The cart is brought into proper position for filling, by taking hold of the body D and placing it in contact with the shafts B B', when it is instantly secured by the spring-latch G. The tail-board $D^1$ is simultaneously secured by the motion of the cart-body D forcing the inner end of latch F through the eye of socket $F^2$, which raises the outer end of latch F in proper position behind the tail-board $D^1$. In dumping, this motion is reversed, and the outer end of latch F is depressed sufficiently to allow the tail-board $D^1$ to swing freely on its hinges $D^2$ $D^3$.

What we here claim as new, and desire to secure by Letters Patent, is—

1. The combination and arrangement of the brackets E E', body D, and shafts B B', forming a fixed dumping-axis, substantially as and for the purpose set forth.

2. The hinges $D^2$ $D^3$ constructed with bent leaves, in combination with the body D and tail-board $D^1$, when used in the manner or for the purpose specified.

GEORGE L. COLLINS.
GEORGE GASCOIGNE.

Witnesses:
WM. H. IVENS,
DAVID C. RULON.